Feb. 28, 1956  L. W. SONGER  2,736,529
VALVE SEAT LOCKING MECHANISM
Filed April 27, 1955
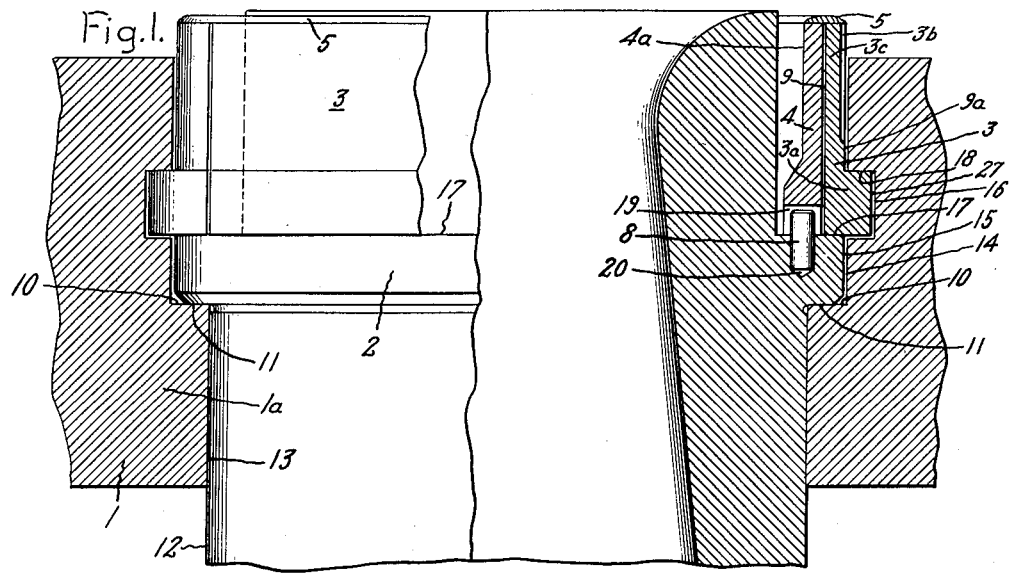
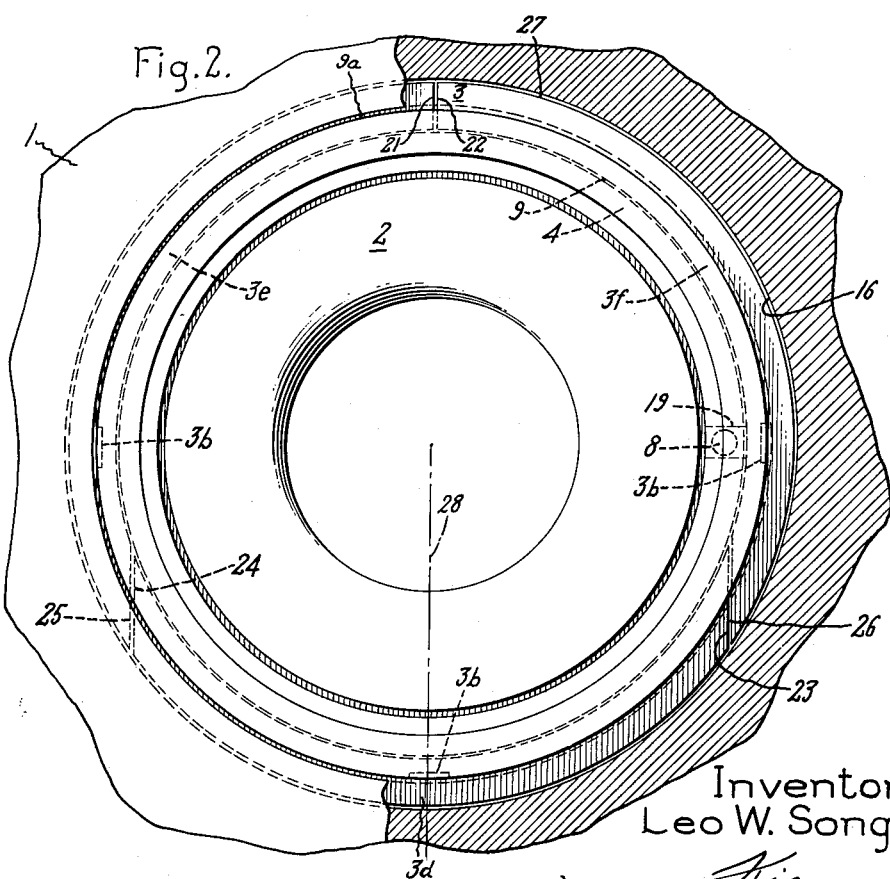
Inventor:
Leo W. Songer
by *Kiess*
His Attorney

United States Patent Office 2,736,529
Patented Feb. 28, 1956

2,736,529

VALVE SEAT LOCKING MECHANISM

Leo W. Songer, Scotia, N. Y., assignor to General Electric Company, a corporation of New York Application April 27, 1955, Serial No. 504,238

6 Claims. (Cl. 251—360)

This invention relates to valves for controlling the flow of elastic fluid, particularly to the valve seat insert structure of such a valve used in a high-temperature steam turbine.

In the typical high-temperature turbine, the flow of steam through the turbine is controlled by a plurality of governing valves, which may be of the general type disclosed in the U. S. patent to F. H. Van Nest et al., 2,613,542 issued October 14, 1952. These control valves are subject to vortex forces caused by the steam flowing through the valve and axial loads acting on the valve seat which tend to displace it from its supporting member in the turbine.

To prevent this axial displacement of the valve seat, it is locked in place relative to the turbine shell casing. Heretofore, this has been accomplished by a locking member located between the valve seat and its supporting member. This locking member transmits the thrust loads imposed on the valve seat to the supporting member. A thrust transmitting member previously used had a solid retaining ring which had to be welded directly to the shell casing.

This type of construction required that the shell casing, which is very massive and bulky, be preheated and the temperature thereof very closely controlled so that a good weld can be made to join the valve seat and the casing. In addition, the valve seat and casing are normally made of two different materials, which may result in differential thermal expansion taking place between them when exposed to the hot motive fluid. However, even if they were made of the same material, the substantial difference in size between the casing and the locking ring would still result in serious differential expansion. This differential expansion sets up thermal stresses which tend to crack the weld, leading to the valve seat becoming loose in the turbine shell or to the crack propagating into the shell casing.

Accordingly, it is an object of this invention to provide improved means for locking the wave seat in place relative to the valve seat supporting member, without requiring the locking mechanism itself to be welded to the supporting member.

A further object is to provide a valve seat locking mechanism which can be readily removed and rewelded, permitting repeated re-use of the same parts.

A still further object is to provide a valve seat locking arrangement which can be quickly and easily assembled in and removed from the turbine.

Other objects and advantages will become apparent from the following description taken in connection with the accompanying drawings, in which Fig. 1 is a front view partially in section showing the valve seat and its locking mechanism mounted in place in the turbine; and Fig. 2 is a plan view partially in section with the turbine casing broken away.

Generally stated, the invention is practiced by providing a split locking ring disposed between the valve seat and turbine casing to lock the valve seat relative to the casing and to transmit the axial loads acting on the valve seat to the casing and maintaining the locking ring in place by a solid retaining ring secured to the locking ring.

Referring to Fig. 1, a turbine casing wall portion 1 defines an annular shoulder 10 adapted to support a valve seat member 2. The seat member defines a radially extending annular surface 11 which engages the mating surface 10 of the casing 1. The casing 1 and the seat 2 are usually made of an alloy steel, having a comparatively high coefficient of thermal expansion. The surfaces 12, 13 of valve seat member 2 and casing 1 engage with a press-fit. Close contact between shoulders 10, 11 and surfaces 12, 13 prevents steam from leaking between the valve seat and the shell casing.

The diameter of the bore 14 of casing 1 above shoulder 10 is slightly larger than the diameter of surface 15 of the valve seat. This clearance space permits free differential thermal expansion to take place between the valve seat and casing when subjected to the high temperature motive fluid.

The size of the valve seat 2 relative to the axial length portion 1a of the casing 1 results in a differential thermal expansion of the valve seat relative to the casing. The valve seat is much thinner than the portion 1a and it moves relative thereto in a direction tending to displace it from its supporting member. In addition, the steam expands while flowing through the valve seat and creates aerodynamic vortex forces which place additional forces on the valve seat tending to displace it axially from its location in the shell casing. These forces would have a tendency to eventually work the valve seat loose relative to the casing.

Accordingly, axial movement of the valve seat is prevented by locking it in place relative to the turbine casing. To this end, a locking member 3 is disposed between the valve seat and casing. This is a split ring, formed in three arcuate segments 3d, 3e and 3f inserted into the annular recess 16 defined by the casing 1, as can be seen from Fig. 2. The segment 3d has end surfaces 23, 24 parallel to its normal radius 28. The adjacent segments 3e, 3f are bordered by radial surfaces 21, 22 respectively and surfaces 25, 26 respectively parallel to end surfaces 23, 24 of segments 3d (see Fig. 2). This permits easy insertion into recess 16 without requiring any space between adjacent segments. It is apparent that, if all ends of the segments were radial, a space would exist between the segments after they were inserted into recess 16. This space would be necessary to permit the segments to be inserted in a radial direction into grooves 16.

The ring 3 in cross-section is substantially L-shaped. The bottom leg 3a serves as the locking portion of the ring between the valve seat and the supporting member. The upper portion of the segmented ring 3 is in the form of an annular "skirt" 3c, which extends above the adjacent surfaces of wall 1.

The ring fits snugly between the annular surface 17 of valve seat 2 and the upper surface 18 of recess 16. The axial dimension of leg 3a of locking ring 3 is such that the segments closely fit between annular surfaces 17, 18. The segments are further provided with a plurality of spaced axially extending grooves 3b. These are for the insertion of a screw driver, or other wedge tool, for removing the ring segments from recess 16.

The close fit of the ring 3 between the surfaces 17, 18 constitutes a positive lock between the valve seat and the casing. This connection serves to transmit the axial loads acting on the valve seat 2 to the casing 1. Spaces 9a and 27 are provided between the outer surfaces of ring 3 and the adjacent portions of the casing 1 to permit free differential thermal expansion to take place between the locking segments and the casing.

This segmental locking ring must in some manner be secured against radial displacement. Welding the locking member directly to the casing 1, as has been previously done, is very difficult and, due to differential thermal expansion, has resulted in the welds cracking. Therefore, in accordance with the invention, the segments of locking ring 3 are secured against radial movement by a second retaining ring member 4. This ring is solid and has an axially extending annular "skirt" portion 4a which has a radial thickness substantially equal to that of the skirt portion 3c of the segmental ring 3. The outer diameter of skirt 4a is slightly less than the inner diameter of skirt 3c thus providing an annular clearance space 9. The skirt portions 3c, 4a are welded together by weld 5. This weld is shown as annular but it can be a series of tack welds. The space 9 permits the rings 3, 4 to be drawn toward each other upon cooling of the welds, without setting up excessive cooling strains. This space also prevents the setting up of thermal stresses between the two rings due to temperature differences in normal operation.

The ring 4 defines a radial slot or recess 19 into which a dowel pin 8 extends to prevent the ring 4 from rotating. The other end of the pin 8 is disposed in a recess 20 in the valve seat 2, as will be obvious from Fig. 1.

The valve seat is assembled and locked in the following manner. The seat 2 is pressed into the casing with the surfaces 11, 12 of the valve seat tightly fitting the adjacent surfaces 10, 13 of the shell 1. This press-fit prevents steam from leaking between the valve seat member and the casing. The locking ring segments 3d, 3e, and 3f are then separately inserted in a radial direction into groove 16, segments 3e, 3f first and segment 3d last, with a close fit between the surfaces 17 and 18 of the valve seat and casing respectively. The dowel pin 8 is now inserted into recess 20. The retaining ring 4 is inserted adjacent the locking ring 3 with the pin 8 located in the groove 19. The locking ring 3 is then welded at 5 to the retaining ring 4.

The valve seat can be easily removed in the following way: The weld 5 is removed by chipping or grinding, and the retaining ring is removed. This is easily accomplished because clearance space 9 insures freedom of ring 4 once weld 5 is removed. A screw driver is then driven into slot 3b and the locking segments are thus pried out of recess 16. The valve seat is then free to be removed axially from the shell.

This construction has many advantages. The locking ring 3 is maintained in place without requiring that it be welded directly to the casing. This removes the possibility of the casing developing cracks during or after the welding process, which could progress into the casing and make replacement of the casing necessary. This also does away with having to preheat the casing and very accurately control the welding between the ring 3 and the casing. The fact that the skirts 4a, 3c extend substantially above the adjacent surfaces of shell 1, allows the rings 3, 4 to be removed and repeatedly rewelded. Also, the locking elements may be readily replaced without affecting the casing shell in any way.

Thus it can be seen that the invention provides a simple and much improved locking mechanism for a valve seat, which can be quickly and easily assembled and does not have to be permanently secured directly to the valve seat support member.

While only one embodiment of the invention has been described specifically, it will be apparent to those skilled in the art that many alterations and substitutions of mechanical equivalents may be made. For example the locking ring can be made of two or more segments. Also, the shape of the seat member 3 may take many forms. And the dowel 8 could be replaced by other key means for preventing rotation of ring 4.

It is, of course, intended to cover by the appended claims, all such modifications as fall within the true spirit and scope of the invention.

What I claim as new and desire to secure by Letters Patent of the United States is:

1. In a valve seat assembly, the combination of a generally cylindrical valve seat member defining an axial passage therethrough, the valve seat member having a radially extending annular lip defined between first and second radially extending annular surfaces, a supporting member for the valve seat defining a circular opening of two different diameter portions adapted to receive the valve seat, the supporting member defining a third radially extending annular surface connecting the two portions of different diameters and adapted to abut said first radially extending annular surface, an annular recess defined by the supporting member adjacent said second radially extending annular surface, and locking means comprising a first segmental ring member abutting said second radially extending surface and extending into said recess, whereby the valve seat member is locked relative to the supporting member, and a second retaining ring member disposed concentrically within the first ring for maintaining the locking means in position, and means securing said second ring to said first ring.

2. A valve seat assembly comprising, a generally cylindrical valve seat insert member defining an axial passage therethrough, the insert member having a radially extending annular lip defined between first and second radially extending annular surfaces, a supporting member for the valve seat defining a circular opening of two different diameter portions adapted to receive the valve seat, the smaller diameter portion being equal to the outer diameter of said valve seat adjacent the lip portion and the larger diameter forming a small clearance space with the outer surface of the annular lip, said supporting member defining a third radially extending annular surface connecting the two portions of different diameters and adapted to abut said first radially extending annular surface, the contact between said first and third annular surfaces and the smaller diameter portion of the supporting member and the adjacent diameter portion of the valve seat defining a fluid-tight contact whereby leakage of motive fluid is prevented between the valve seat and supporting member, an annular recess defined by the supporting member adjacent said second radially extending annular surface, locking means abutting the second radially extending annular surface and extending into said recess whereby the valve seat member is fixed relative to the supporting member, the locking means comprising a split ring having arcuate segments which are adapted to be inserted radially into said recess, retaining ring means for maintaining the locking ring segments in position, and means securing the retaining ring and locking ring together.

3. In a valve seat assembly, the combination of a cylindrical valve seat member defining an axial passage therethrough, a radially extending annular lip defined by the valve seat member between first and second radially extending annular surfaces, a supporting member for the valve seat defining a circular opening of two different diameter portions adapted to receive the valve seat, a third radially extending annular surface defined by the supporting member which connects the two portions of different diameters and is adapted to abut said first radially extending annular surface of the valve seat, a recess defined by the supporting member adjacent said second radially extending annular surface, locking means abutting said second radially extending surface and extending into said recess whereby the valve seat member is locked in place relative to the supporting member, the locking means comprising a split ring having at least two segments adapted for radial insertion into said recess, the split ring defining an axially extending skirt portion, retaining means disposed between the locking ring and valve seat to maintain the split locking ring in place between the valve seat and supporting member, the retaining means comprising a relatively thin-walled solid ring defining a skirt portion disposed adjacent the axially extending skirt portion of the split locking ring, and means connecting the retaining ring to the locking ring segments comprising a weld deposit securing the skirt portion of the locking ring to the retaining ring.

4. A valve in accordance with claim 3 in which said second radially extending annular surface defines a recess, pin means disposed in said recess, a notch defined by said retaining ring adapted to extend over said pin means when the retaining ring is inserted into place whereby the retaining ring is prevented from circumferential movement.

5. In a valve seat assembly, the combination of a cylindrical valve seat member defining an axial passage therethrough, the valve seat member having portions of two different external diameters disposed on opposite sides of a radially extending annular lip defined between first and second radially extending annular surfaces, a supporting member of the valve seat defining a circular opening of two different diameter portions adapted to receive the valve seat, the supporting member defining a third radially extending annular surface connecting the two portions of different diameters and adapted to abut the first radially extending annular surface, the smaller diameter portion of the supporting member being equal to the larger of the two external diameters of the valve seat adjacent said annular lip portion, whereby the leakage of motive fluid is prevented between the valve seat and its supporting member, the larger diameter portion of the supporting member being slightly larger than the outer diameter of said annular lip portion whereby a clearance space is formed therebetween to permti differential thermal expansion between the valve seat member and the supporting member, an annular recess defined by the supporting member adjacent said second radially extending annular surface, locking means securing the valve seat relative to the supporting member and comprising a first split locking ring having a plurality of arcuate segments adapted for radial insertion into said recess and abutting said second annular radially extending surface, said first ring defining an axial extending skirt portion, a second solid retaining ring having an outside diameter slightly smaller than the inner diameter of said first ring whereby an annular clearance space is formed therebetween, said second ring defining an axially extending skirt portion disposed adjacent to said skirt portion of the first ring, the valve seat member defining a second recess in said second annular surface, key means disposed in said second recess, a notch defined by said second retaining ring adapted to receive said key means, whereby the retaining ring is restrained from circumferential displacement relative to the locking ring, and means connecting the second ring to the first segmental ring comprising a weld deposit securing together the skirt portions of said first and second rings.

6. In a valve seat assembly, the combination of a cylindrical valve seat member defining an axial passage therethrough, the valve seat member having portions of two different external diameters disposed on opposite sides of a radially extending annular lip defined between first and second radially extending annular surfaces, a supporting member for the valve seat defining a circular opening of two different diameter portions adapted to receive the valve seat, the supporting member defining a third radially extending annular surface connecting the two portions of different diameters and adapted to abut the first radially extending annular surface, the larger diameter portion of the supporting member being slightly larger than the outer diameter of said annular lip whereby a clearance space is formed therebetween to permit differential thermal expansion between the valve seat and the supporting member, an annular recess defined by the supporting member adjacent said second radially extending annular surface, locking means securing the valve seat relative to the supporting member comprising a first spilt locking ring having a plurality of arcuate segments adapted for radial insertion into said recess and abutting said second annular radially extending surface, said first ring defining a first axially extending skirt portion, the outer diameters of the portion of the locking ring extending into the annular recess and the first skirt portion being less than the inner diameter of the annular recess and the larger diameter portion of the supporting member respectively, whereby free differential thermal expansion between the locking ring and supporting member can take place, the locking ring defining grooves in the outer surface of the skirt portion whereby a wedge tool can be inserted to remove the locking ring segments, a second solid retaining ring having an outside diameter slightly smaller than the inner diameter of said first ring whereby an annular clearance space is formed therebetween, said second ring defining a second axially extending skirt portion disposed adjacent to said first skirt portion, the valve seat member defining a second recess in said second annular surface, key means disposed in said second recess and a notch defined by said second retaining ring adapted to receive said key means whereby the retaining ring is restrained from circumferential displacement relative to the locking ring, and means connecting the second ring to the first segmental ring comprising a weld deposit securing together the skirt portions of said first and second rings.

No references cited.